United States Patent
Sofman et al.

(10) Patent No.: US 8,464,303 B2
(45) Date of Patent: Jun. 11, 2013

(54) SYSTEM AND METHOD FOR DETERMINING A CACHE ARRANGEMENT

(75) Inventors: Lev B. Sofman, Allen, TX (US); Bill Krogfoss, Frisco, TX (US); Anshul Agrawal, Plano, TX (US)

(73) Assignee: Alcatel Lucent, Paris (FR)

( * ) Notice: Subject to any disclaimer, the term of this patent is extended or adjusted under 35 U.S.C. 154(b) by 635 days.

(21) Appl. No.: 12/284,079

(22) Filed: Sep. 18, 2008

(65) Prior Publication Data

US 2010/0071012 A1 Mar. 18, 2010

(51) Int. Cl.
*H04N 7/173* (2011.01)

(52) U.S. Cl.
USPC ............... 725/115; 725/92; 725/145

(58) Field of Classification Search
USPC ...... 725/91–92, 114, 115, 145; 709/213–216, 709/231, 235; 707/6
See application file for complete search history.

(56) References Cited

U.S. PATENT DOCUMENTS

| | | | |
|---|---|---|---|
| 6,094,680 A * | 7/2000 | Hokanson | 709/223 |
| 6,868,452 B1 | 3/2005 | Eager et al. | |
| 7,143,393 B1 * | 11/2006 | Ezra et al. | 717/127 |
| 7,664,876 B2 * | 2/2010 | Garcia-Luna-Aceves et al. | 709/240 |
| 2002/0104099 A1 * | 8/2002 | Novak | 725/136 |
| 2004/0103437 A1 | 5/2004 | Allegrezza | |
| 2007/0056002 A1 | 3/2007 | Ganesan | |
| 2007/0208737 A1 * | 9/2007 | Li et al. | 707/6 |

* cited by examiner

*Primary Examiner* — Kristine Kincaid
*Assistant Examiner* — Sumaiya A Chowdhury
(74) *Attorney, Agent, or Firm* — RGIP LLC

(57) ABSTRACT

In an IPTV network, one or more caches may be provided at the network nodes for storing video content in order to reduce bandwidth requirements. Video content titles may be stored in the cache in accordance with a calculated cache arrangement that minimizes the total incremental transport cost of the content traffic.

20 Claims, 2 Drawing Sheets

US 8,464,303 B2

SYSTEM AND METHOD FOR DETERMINING A CACHE ARRANGEMENT

FIELD OF THE INVENTION

This invention relates to Internet Protocol Television (IPTV) networks and in particular to caching of video content at nodes within the network.

BACKGROUND OF THE INVENTION

In an Internet Protocol TeleVision (IPTV) network, Video on Demand (VOD) and other video services generate large amounts of unicast traffic from a Video Head Office (VHO) to subscribers and, therefore, require significant bandwidth and equipment resources in the network. To reduce this traffic, and subsequently the overall network cost, part of the video content, such as most popular titles, may be stored in caches closer to subscribers. For example, a cache may be provided in a Digital Subscriber Line Access Multiplexer (DSLAM), in the Central Offices (CO) or in Intermediate Offices (IO). Selection of content for caching may depend on several factors including size of the cache, content popularity, etc. Content popularity changes with time and, at any given moment, may be different for various demographic areas.

What is required is a system and method for determining an appropriate caching arrangement.

SUMMARY OF THE INVENTION

In accordance with one aspect of the disclosure, there is provided a method for caching a plurality of video content titles in an Internet Protocol TeleVision network comprising a plurality of caches at a plurality of network locations. The method comprises defining a network traffic cost dependent on a distribution of the plurality of video content titles in the plurality of caches, determining a distribution of the plurality of video content titles that substantially minimizes the network traffic cost, and distributing the plurality of video content titles to the caches in accordance with the determined distribution.

In accordance with one aspect of the disclosure, there is provided a network node of an Internet Protocol TeleVision network comprising a cache, wherein the cache stores a plurality of video content titles and wherein the titles stored in the cache are in accordance with a minimized solution of a content distribution dependent network traffic cost formula.

In accordance with one aspect of the disclosure, there is provided a computer-readable medium comprising computer-executable instructions for execution by a first processor and a second processor in communication with the first processor, that, when executed cause the first processor to provide input parameters to the second processor, and cause the second processor to calculate a cache arrangement for a plurality of video content titles of an Internet Protocol TeleVision network.

BRIEF DESCRIPTION OF THE DRAWINGS

Reference will now be made to specific embodiments, presented by way of example only, and to the accompanying drawings in which.

DETAILED DESCRIPTION OF THE INVENTION

In an IPTV network, caching can be used to reduce the costs of transport networks. That is, moving content closer to subscribers reduces the total amount of transport bandwidth required (e.g. at DSLAM). There is a cost of deploying memory (storage) closer to the subscriber which increases the overall network costs. For certain services like Video on Demand the costs of storage are high, and thus it is economically expensive to move content close to the subscriber. Thus the economic business case of caching VoD is difficult as you get closer to the subscriber.

Figure 1:
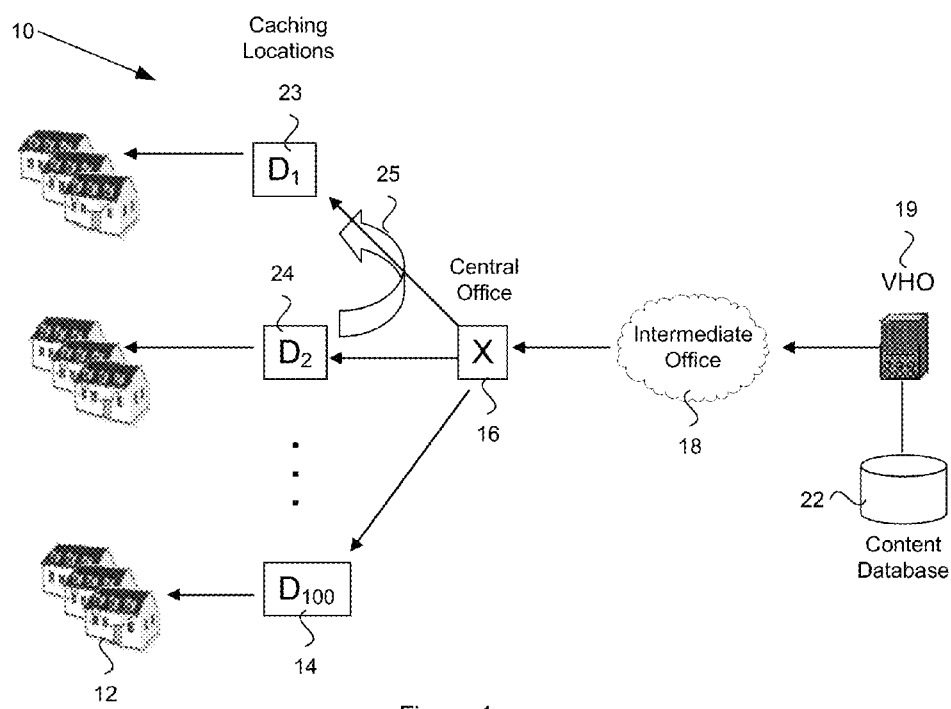
FIG. 1 depicts an Internet Protocol Television network.

In a typical IPTV architecture 10, illustrated in FIG. 1, several subscribers 12 are connected to a Digital Subscriber Line Access Multiplexer (DSLAM) 14. Several DSLAMs, e.g. D1, D2 ... D100 may be connected to an aggregation node 16 such as a Central Office CO. Several COs 16 may be connected to an Intermediate Office (IO) 18 and finally to a Video Home Office (VHO) 19. The VHO 19 stores titles of Video On Demand (VoD) content, e.g. in a content database 22.

In one embodiment, there is provided a caching architecture where part of the content is cached at the edge of the network, e.g. at DSLAMs, aggregation nodes, etc, and the remaining part is stored in one or more servers at the VHO. Each cache location e.g. an individual DSLAM, serves some community of subscribers. Therefore, the list of cached items should be customized for each cache location, and different cache locations store different content.

The caching architecture treats the combined memory total of the DSLAM caches, subtended from the same CO or router/node, as a single logical memory store. This enables a high cache hit rate without large stores for every DSLAM, thus making it economically feasible to cache long tail content at the DSLAM. To accomplish this, the unutilized upstream bandwidth is used to serve requests from different DSLAMs, and the parent node u-turns the data towards the requester. The partitioning of content at each DSLAM should consider the popularity of each file, the uplink capacity, the file sizes and potentially another remote cache location.

U-turn caching is depicted in FIG. 1. Suppose that a subscriber that is served by cache location D1 23 requested video content that is not cached at D1, but cached at a "neighbor" location D2 24 (locations D1 and D2 are subtended to the same aggregation node X, e.g., central office 16). In some cases, it would be more cost effective to request the content in question from cache location D2 24 rather than from VHO 19, for example where there was high bandwidth utilization downstream from the VHO but low bandwidth utilization upstream. The content may be sent from cache location D2 to cache location D1 through a node X, using "U-turn" route D2-X-D1, as depicted by arrow 25.

As a result, when a subscriber requests a particular title, there may be three possible scenarios for the title requested by the subscriber and three corresponding traffic routes generated by this request:

1) The title is cached in and requested from the location that serves the subscriber (local caching), corresponding traffic is called a local traffic;
2) The title is not cached in the location that serves the subscriber, but is cached in and requested from some "neighbor" location (U-turn caching), corresponding traffic is called U-turn traffic;

3) The title is not cached in the location that serves the subscriber and is not cached in any of "neighbor" locations; in this case the title should be requested from VHO, corresponding traffic is called remote traffic.

From a transport cost stand point, the first scenario usually is the least expensive, however, the cost of cache memory and distribution at the local node may be prohibitively expensive.

In one embodiment of the invention, an optimization model is used for determining the most optimal flexible caching. In one embodiment, a goal of the optimization is to find a caching arrangement that gives the most cost effective solution subject to some natural constraints. A caching arrangement may consider how each content title is cached—should it be cached, and, if it should, in which caching location(s) the title should be cached. The optimization model is based on incremental cost of caching rather than green field cost, assuming that the cache will be introduced on an existing network.

Figure 2:
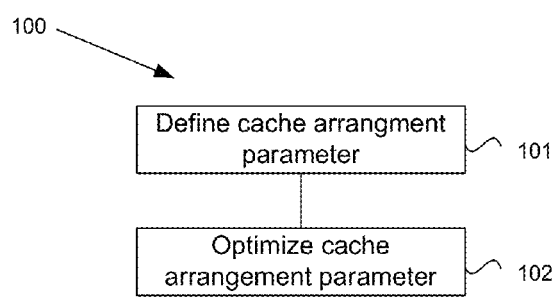
FIG. 2 depicts a method for determining a caching arrangement.

A method for caching a plurality of video content titles in an Internet Protocol TeleVision network is depicted in FIG. 2. In the method 100, a network traffic cost is defined at step 101. The network traffic cost is dependent on a distribution of the plurality of video content titles in the plurality of caches. At step 102, a distribution of the video content titles that minimizes the network traffic cost is determined, and then at step 103, the video content titles are distributed to the caches in accordance with the determined distribution.

The flexible caching optimization problem may be formulated as a mixed-integer programming (MIP) problem. CPLEX, Frontline Systems Premium Solver or other similar software may be used to solve the MIP problem. In order to formulate the optimization problem, the problem's parameters and decision variables will now be described.

Let L be a number of cache locations. It is assumed that each cache location is connected with an aggregation node (e.g., central office), and this connection has $BW_{up}$ upstream and $BW_{down}$ downstream bandwidth.

Let $N_i$ be a number of subscribers for i-th cache location, i=1,2,... L.

Let $R_i$ and $M_i$ be, correspondingly, maximum traffic throughput and memory size for i-th cache location, i=1,2, ..., L.

Let K be a total number of titles (e.g., VoD movies). Attributes of each title are its size (how much memory this title occupies), $S_j$, and traffic bit rate, $T_j$, j=1,2, ...,K.

It is assumed that a title's popularity is a function of the title's id and location: $p_{ij}$ is a popularity of j-th title at i-th cache location, i=1,2, ..., L; j=1,2, ..., K. Therefore, an average number of concurrent requests for j-th title at i-th location will be $N_i p_{ij}$.

Binary decision variables, $a_{ij}$, define a caching arrangement, i.e. for distribution of titles between cache locations: $a_{ij}=1$ if j-th title is cached at i-th location, and $a_{ij}=0$ otherwise, i=1,2, ..., L; j=1,2, ..., K.

Binary variables $a_j$, j=1,2, ..., K, indicate whether j-th title is cached at one of caching locations ($a_j=0$), or should be requested from VHO ($a_j=1$). Variables $a_j$ may be expressed through decision variables $a_{ij}$, as will be described below.

Another decision variable, $U_{ij}$, i=1, 2, ..., L; j=1,2, ..., K is an average number of concurrent copies of j-th title that have been sent through uplink from the i-th cache location.

An incremental transport cost per unit of traffic:
$C_1$—incremental transport cost per unit of local traffic
$C_2$—incremental transport cost per unit of U-turn traffic
$C_3$—incremental transport cost per unit of remote traffic A goal of optimization is to find such a caching arrangement that a total incremental transport cost is minimal:

$$C_1 T_{loc} + C_2 T_U + C_3 T_{rem} \to \min \quad (1)$$

where local traffic, $T_{loc}$, is defined as:

$$T_{loc} = \sum_{i=1}^{L} \sum_{j=1}^{K} a_{ij} N_i p_{ij} T_j \quad (1a)$$

U-turn traffic, $T_U$, is defined as:

$$T_U = \sum_{i=1}^{L} \sum_{j=1}^{K} U_{ij} T_j \quad (1b)$$

and remote traffic, $T_{rem}$, is defined as:

$$T_{rem} = \sum_{i=1}^{L} \sum_{j=1}^{K} a_j N_i p_{ij} T_j \quad (1c)$$

The network traffic cost defined by equation 1 is dependent on the distribution of the video content titles, for example by the parameter $a_{ij}$. Any feasible solution (caching arrangement) should satisfy the following constraints:

Cache memory constraint: total size of titles cached at any cache location should not exceed the maximum memory size of corresponding cache:

$$\sum_{j=1}^{K} a_{ij} S_j \le M_i \text{ for } i=1, 2, \ldots, L \quad (2)$$

Cache throughput constraint: total traffic (both upstream and downstream) generated by requests for titles cached at any cache location should not exceed the maximum traffic throughput of corresponding cache:

$$\sum_{j=1}^{K} (a_{ij} N_i p_{ij} T_j + U_{ij} T_j) \le R_i \text{ for } i=1, 2, \ldots, L \quad (3)$$

Uplink Traffic Constraint:

$$\sum_{j=1}^{K} U_{ij} T_j \le BW_{up} \text{ for } i=1, 2, \ldots, L \quad (4)$$

Downlink traffic constraint (5)

$$\sum_{j=i}^{K} (1-a_{ij}) N_i p_{ij} T_j \le BW_{down} \text{ for } i=1, 2, \ldots, L$$

Constraint on balance between uplink traffic and U-turn traffic: a total number of concurrent copies of j-th title that have been sent through up-link from all cache locations should be equal to a total number of requests for this title from all locations:

$$\sum_{i=1}^{L} U_{ij} = \sum_{i=1}^{L} (1 - a_{ij} - a_j) N_i p_{ij} \quad j = 1, 2, \ldots, K \quad (6)$$

Various Constraints on Decision Variables:

$$a_j \geq 1 - \sum_{i=1}^{L} a_{ij} \quad \text{for } j = 1, 2, \ldots, K \quad (7a)$$

$$a_j \leq 1 - a_{ij} \text{ for } i=1,2,\ldots,L; j=1,2,\ldots,K \quad (7b)$$

$$a_{ij}, a_j \text{—binary variables for } i=1, 2, \ldots, L; j=1, 2, \ldots, K \quad (7c)$$

$$U_{ij} \geq 0 \text{ for } i=1,2,\ldots,L; j=1,2,\ldots,K \quad (7d)$$

With the caching arrangement appropriately formulated, the minimization problem set out in equations 1 to 1(d) may be solved by the CPLEX, Frontline Systems Premium Solver or other similar software. The results of the software solver determine the caching arrangement, in particular the binary decision variables $a_{ij}$ that establish in which cache a title should be stored.

This caching model is more flexible than previous caching models, where content popularity distribution was the same for all communities of subscribers. Popularity distribution for each cache location usually is steeper than popularity distribution for the whole combined area; therefore there are potentially more benefits from caching that takes into account popularity distribution at each caching location.

Figure 3:
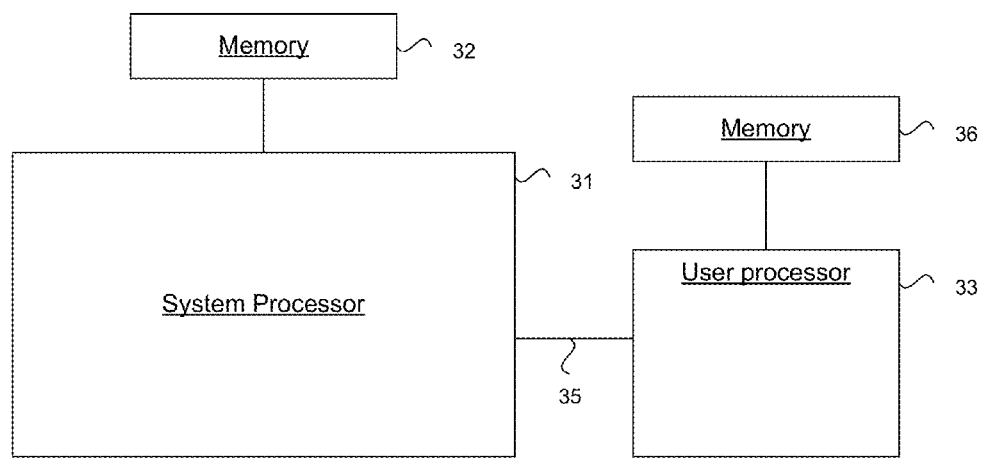
FIG. 3 depicts an arrangement of processors that may be used for determining a caching arrangement.

In one embodiment, the optimization tool may be embodied on one or more processors as shown in FIG. 3. A first processor 31 may be a system processor operatively associated with a system memory 32 that stores an instruction set such as software for calculating a cache arrangement. The system processor 31 may receive parameter information from a second processor 33, such as a user processor which is also operatively associated with a memory 36. The communication between the processors 31, 33 may be provided by a suitable communications link 35 which may be hard wired, wireless, internet or FTP based, or any other suitable communications link. The memory 36 may store an instruction set that when executed allows the user processor 33 to receive input parameters and the like from the user. A calculation of the cache arrangement may be performed on either the system processor 31 or the user processor 33. For example, input parameters from a user may be passed from the user processor 33 to the system processor 31 to enable the system processor 31 to execute instructions for performing the calculation. Alternatively, the system processor may pass formulas and other required code from the memory 32 to the user processor 33 which, when combined with the input parameters, allows the processor 33 to calculate a cache arrangement. It will be understood that additional processors and memories may be provided and that the calculation of the cache functions may be performed on any suitable processor. In one embodiment, at least one of the processors may be provided in a network node and operatively associated with the cache of the network node so that, by ongoing calculation of the cache functions, the minimization of the total incremental transport cost may be maintained.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for caching a plurality of video content titles in an Internet Protocol TeleVision (IPTV) network comprising a plurality of caches at a plurality of network locations, the method comprising:
    defining a network traffic cost dependent on a distribution of the plurality of video content titles to the plurality of caches;
    distributing the plurality of video content titles to the plurality of caches by distributing different ones of the video content titles to each of the plurality of caches;
    retrieving at least one video content title from a remote neighbor cache among the plurality of caches in response to a request generated by a subscriber for the at least one video content title received at a local cache among the plurality of caches;
    defining a total incremental transport cost of the plurality of video content titles, wherein the total incremental transport cost is defined as a sum of products including an incremental transport cost per unit of local traffic multiplied by a traffic bit rate, an incremental transport cost per unit of U-turn traffic multiplied by a u-turn traffic bit rate, and an incremental transport cost per unit of remote traffic multiplied by a remote traffic bit rate; and
    transmitting the at least one video content title to the subscriber.

2. The method according to claim 1 comprising:
    minimizing the total incremental transport cost.

3. The method according to claim 2 comprising determining a binary decision variable $a_{ij}$, wherein $a_{ij}=1$ if a j-th video content title is to be cached at an i-th cache location.

4. The method according to claim 2 comprising determining $a_{ij}$ for each video content title.

5. The method according to claim 2 comprising determining $a_{ij}$ for each cache location.

6. The method according to claim 2 comprising storing the j-th video content title in the i-th cache if the binary decision variable $a_{ij}=1$.

7. The method according to claim 2 wherein the total incremental transport cost is defined as:

$$C_1 T_{loc} + C_2 T_U + C_3 T_{rem}$$

where local traffic, $T_{loc}$, is defined as:

$$T_{loc} = \sum_{i=1}^{L}\sum_{j=1}^{K} a_{ij} N_i p_{ij} T_j$$

U-turn traffic, $T_U$, is defined as:

$$T_U = \sum_{i=1}^{L}\sum_{j=1}^{K} U_{ij} T_j$$

and remote traffic, $T_{rem}$ is defined as:

$$T_{rem} = \sum_{i=1}^{L}\sum_{j=1}^{K} a_j N_i p_{ij} T_j,$$

where $C_1$ is an incremental transport cost per unit of local traffic, $C_2$ is an incremental transport cost per unit of U-turn traffic, $C_3$ is an incremental transport cost per unit of remote traffic;

where $a_j$ indicates whether a j-th title is cached at one of caching locations;

where $p_{ij}$ is a popularity of the j-th title at the i-th cache location and $N_i$ is a number of subscribers for the i-th cache location;

where $U_{ij}$ is an average number of concurrent copies of j-th title that have been sent through uplink from the i-th cache location; and where $T_j$ is a traffic bit rate for the j-th title.

8. The method according to claim 7 comprising minimizing the total incremental transport cost using a mixed-integer programming solver.

9. The method according to claim 7 comprising defining one or more constraints.

10. The method according to claim 9 wherein defining one or more constraints comprises defining at least one of a cache memory constraint, a cache throughput constraint, an uplink traffic constraint and a downlink traffic constraint.

11. The method according to claim 10 comprising minimizing the total incremental transport cost subject to the one or more constraints.

12. A network node of an Internet Protocol TeleVision (IPTV) network comprising:
a single logical memory store based on a plurality of caches corresponding to a plurality of different network devices, the single logical memory store configured to store a plurality of video content titles;
a processor configured to
define a network traffic cost dependent on a distribution of the plurality of video content titles to the plurality of caches,
retrieve at least one video content title from a remote neighbor cache among the plurality of caches in response to a request generated by a subscriber for the at least one video content title received at a local cache among the plurality of caches;
define a total incremental transport cost of the plurality of video content titles, wherein the total incremental transport cost is defined as a sum of products including an incremental transport cost per unit of local traffic multiplied by a traffic bit rate, and incremental transport cost per unit of U-turn traffic multiplied by a u-turn traffic bit rate, and an incremental transport cost per unit of remote traffic multiplied by a remote traffic bit rate; and
a transmitter configured to distribute the plurality of video content titles to the plurality caches by distributing different ones of the video content titles to each of the plurality of caches and transmit the at least one video content title to the subscriber.

13. The network node according to claim 12 wherein the video content titles stored in the cache provide a minimization of a total incremental transport cost.

14. The network node according to claim 13 wherein the total incremental transport cost is defined as a sum of costs of local cache traffic, u-turn cache traffic and remote traffic.

15. The network node according to claim 13 wherein a minimization of the total incremental transport cost determines a binary decision variable $a_{ij}$ for each video content title, where "i" indicates the cache location and "j" indicates the j-th video content title.

16. The network node according to claim 15 wherein the network node stores video content titles for which $a_{ij}=1$.

17. A non-transitory computer-readable storage medium comprising computer-executable instructions that, when executed cause a processor to perform:
calculating a cache arrangement for a plurality of video content titles of an Internet Protocol TeleVision (IPTV) network;
defining a network traffic cost dependent on a distribution of the plurality of video content titles to the plurality of caches;
distributing the plurality of video content titles to the plurality of caches by distributing different ones of the video content titles to each of the plurality of caches;
retrieving at least one video content title from a remote neighbor cache among the plurality of caches in response to a request generated by a subscriber for the at least one video content title received at a local cache among the plurality of caches;
defining a total incremental transport cost of the plurality of video content titles, wherein the total incremental transport cost is defined as a sum products including an incremental transport cost per unit of local traffic multiplied by a traffic bit rate, an incremental transport cost per unit of U-turn traffic multiplied by a u-turn traffic bit rate, and an incremental transport cost per unit of remote traffic multiplied by a remote traffic bit rate; and
transmitting the at least one video content title to the subscriber.

18. The non-transitory computer readable storage medium according to claim 17 comprising instructions that when executed cause the processor to perform: calculating a minimum of a total incremental transport cost function.

19. The non-transitory computer readable storage medium according to claim 18 comprising instructions that when executed cause the processor to perform: determining a cache location for each video content title of the network.

20. The non-transitory computer readable storage medium according to claim 17 comprising instructions that when executed cause the processor to perform: providing at least one constraint including at least one of defining at least one of a cache memory constraint, a cache throughput constraint, an uplink traffic constraint and a downlink traffic constraint.

* * * * *